United States Patent
Wielstra et al.

(10) Patent No.: US 6,828,032 B2
(45) Date of Patent: Dec. 7, 2004

(54) INSULATING LAYER FOR A HEATING ELEMENT

(75) Inventors: Ytsen Wielstra, Drachten (NL); Jolanda Harma Sagitta Winkel, Drachten (NL); Rene Henk Van Der Woude, Drachten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 115 days.

(21) Appl. No.: 10/122,742

(22) Filed: Apr. 15, 2002

(65) Prior Publication Data

US 2002/0155303 A1 Oct. 24, 2002

(30) Foreign Application Priority Data

Apr. 17, 2001 (EP) .............................. 01201401

(51) Int. Cl.[7] .................. B32B 25/20; B32B 27/00; H05B 3/10
(52) U.S. Cl. ................ 428/448; 428/447; 428/450; 428/473.5; 219/543; 219/544; 219/548; 219/552
(58) Field of Search ................ 219/543, 544, 219/548, 552; 428/447, 448, 450, 473.5; 338/258; 427/385.5, 387, 388.1, 409

(56) References Cited

U.S. PATENT DOCUMENTS

| 5,621,843 | A | * | 4/1997 | Neuberger ................... 385/123 |
| 5,635,250 | A | * | 6/1997 | Blum et al. .................. 427/387 |
| 5,665,262 | A | * | 9/1997 | Hajaligol et al. ........... 219/553 |
| 5,691,058 | A | * | 11/1997 | Miyao et al. ................ 428/379 |
| 5,706,064 | A | * | 1/1998 | Fukunaga et al. ............ 349/43 |
| 5,822,675 | A | * | 10/1998 | Paquet et al. ................ 428/561 |
| 5,973,298 | A | * | 10/1999 | Kallgren ................... 219/465.1 |
| 6,037,572 | A | * | 3/2000 | Coates et al. ............. 219/451.1 |
| 6,054,253 | A | * | 4/2000 | Fardad et al. ................ 430/321 |
| 6,392,203 | B1 | * | 5/2002 | Schmidmayer ............. 219/405 |
| 2002/0145134 | A1 | * | 10/2002 | Olding et al. ............... 252/500 |

FOREIGN PATENT DOCUMENTS

| EP | 0954201 A2 | 12/1998 | ............ H05B/3/74 |
| WO | WO9822548 | 11/1997 | ......... C09D/183/06 |

* cited by examiner

Primary Examiner—Jeffrey B. Robertson

(57) ABSTRACT

A heating element employing a substrate, an electrically insulating layer, and a resistive layer. The electrically insulating layer of the heating element includes a first layer that is obtained by a sol-gel process, and a second layer including a resin.

19 Claims, 1 Drawing Sheet

INSULATING LAYER FOR A HEATING ELEMENT

BACKGROUND OF THE INVENTION

1. Field of the Invention

The present invention relates to a heating element, at least employing a substrate, an electrically insulating layer, and a resistive layer. Moreover, the present invention relates to an electrical domestic appliance including such a heating element, as well as to a method of manufacturing said heating element.

2. Description of the Related Art

A known heating element known from U.S. Pat. No. 5,822,675, which discloses a heating element that employs a substrate having on its surface a first layer of a silicon based electrically insulating material. Preferably, the layer is also thermally conductive to transfer a high amount of heat from the electrically resistive layer. To achieve both electrical insulation and thermal conductivity, the first layer preferably includes a filler, such as, for example alumina, silicon carbide or zirconium diboride, in addition to the silicone resin. On a surface of the first layer is a second layer including a silicon based electrically resistive material. Attached to the second layer are at least two separate areas of silicon based electrically conductive material. Each of these separate areas are suitable for connection to a power supply.

A disadvantage of the above heating element is that silicon used in the electrically insulating layer leaks as it takes up water, and therefore exceeds the maximum allowable leakage current of 0.75 mA as specified in IEC 335-1.

SUMMARY OF THE INVENTION

It is an aim of the present invention to provide for a heating element that has a relatively high breakdown voltage. In particular, the present invention aims to provide for a heating element, the substrate of which comprises aluminum or anodized aluminum. It will be clear that the term aluminum comprises both aluminum and alloys of aluminum. Furthermore, the present invention aims to provide for an electrical domestic appliance including such a heating element, as well as to a method of manufacturing the heating element.

These and other objects of the invention are achieved by a heating element which is characterized in that the electrically insulating layer comprises a layer which is obtained by a sol-gel process.

By applying an electrically insulating layer comprising a so-called sol-gel layer several advantages are achieved. First of all, the sol-gel layer shows excellent electrically insulating properties. The carbon content of sol-gel materials is sufficiently low to prevent the formation of a carbonized conductive track in case of failure of the heating, thereby providing a safe heating element. Also, sol-gel materials have a high thermal conductivity which is in the order of magnitude of 0.5–2 W/m/° K. Furthermore, sol-gel material can be processed at temperatures below 400° C., which makes this material suitable to be applied directly to aluminum substrates.

Although the sol-gel electrically insulating layer is especially suitable for application on aluminum substrates, other substrates which are conventionally used for heating elements and which are compatible with the final utility may also be used. The substrates may include, for example, stainless steel, enameled steel or copper. The substrate may be in the form of a flat plate, a tube or any other configuration that is compatible with the final utility.

In particular, the sol-gel process at least comprises the step of mixing an organosilane compound with water.

The organosilane compound advantageously contains at least two hydrolytically condensable substituents.

Preferably, the sol-gel process comprises the step of mixing an organosilane compound and silica particles, in particular colloidal silica particles.

Although several organosilanes can be used, for high temperature applications heat resistant silanes are preferred. Preferred examples of such silanes are methyltrimethoxysilane (MTMS) and tetraethoxysilane (TEOS). An increase of the layer thickness of such layers can be obtained by the addition of fillers, such as colloidal silica.

In some cases, it is necessary to have a certain minimum thickness of the electrically insulating layer, for example in view of the capacitive functioning of the layer. In order to obtain such thickness, the electrically insulating layer may also comprise a resin.

This can be advantageous, in particular when the sol-gel material cannot be applied in the desired thickness.

In order to obtain a screen printable electrically insulating layer, the layer advantageously comprises a resin with an insulating filler.

The insulating fillers may comprise titanium oxide, silicon oxide, aluminum oxide, mica or iron oxide.

Preferably, the resin comprises polyimide.

Advantageously said polyimide may be filled with an insulating filler.

Polyimide is a material with a high temperature resistance and with good electrically insulating properties. The material shows no leakage up till 350° C. The insulating filler material may comprise any insulating filler as mentioned above.

However, in case of extreme load or at the end of life, the heating element may fail. In the process of failure, the polyimide insulating layer may carbonize, thereby forming an electrically conducting track. It will be clear that this can result in dangerous situations.

In order to avoid such dangerous situation, the electrically insulating layer of the heating element preferably comprises at least a first layer which is obtained by a sol-gel process, as well as a second layer which comprises a thermoplastic resin, preferably polyimide.

In case of a breakdown voltage of the polyimide layer, the sol-gel layer will remain insulating and will act as a security of the heating element.

The present invention further relates to an electrical domestic appliance comprising at least a heating element in accordance with the present invention.

The heating elements according to the present invention are especially suitable for use in applications where high temperatures are used. These applications comprise, for example, (steam) irons, kettles, coffee makers, deep frying pans, grills, space heaters, waffle irons, toasters, ovens, water flow heaters, and the like.

Finally, the present invention relates to a method of manufacturing a heating element, at least comprising the steps of: providing a substrate; applying an electrically insulating layer on said substrate; and applying a resistive layer on top of the electrically insulating layer.

The method is characterized in that the electrically insulating layer comprises a layer which is obtained by a sol-gel process.

BRIEF DESCRIPTION OF THE DRAWINGS

The invention will be further elucidated with reference to the following embodiment, the following manufacturing example and the enclosed drawing, in which.

Figure 1:
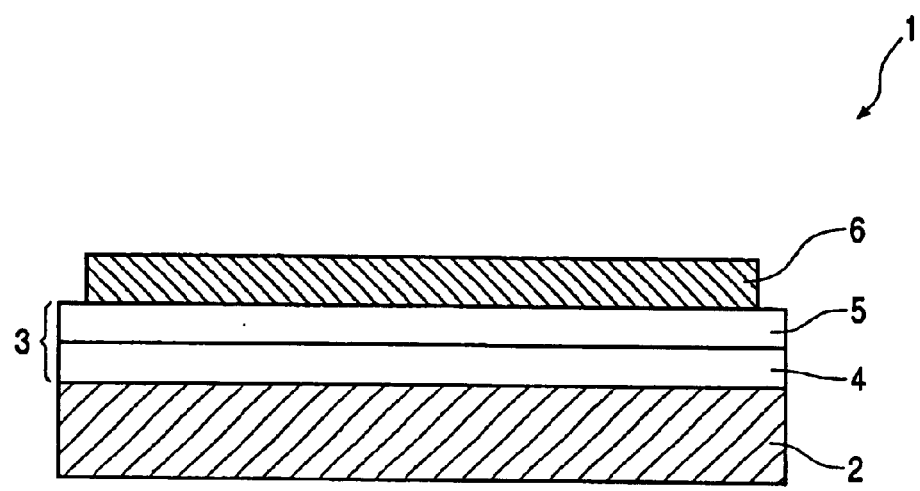
FIG. 1 shows a sectional view of an embodiment of the heating element according to the present invention.

It is noted that the various elements are purely schematic and are not drawn to scale.

DETAILED DESCRIPTION OF THE PRESENTLY PREFERED EMBODIMENT

The heating element 1 as shown in FIG. 1 is built up of a substrate 2, an insulating layer 3, and a resistive layer 6.

In the embodiment shown, the substrate 2 comprises an aluminum alloy which is used for a sole plate of an iron. The substrate 2 is covered with a layer 3 of an electrically insulating material. In the present case, the electrically insulating layer 3 consists of a first layer 4 that is obtained by a sol-gel process, as well as a second layer 5 which comprises a thermoplastic resin. In this case, the thermoplastic resin comprises polyimide.

Sol gel materials can be cured at temperatures below 400° C., which makes it possible to apply the materials directly on an aluminum substrate. As the sol-gel layer 4 has a low carbon content, the creation of a conductive track is prevented, even in case of failure of the heating element. Thus, the insulating properties of the sol-gel layer 4 remain intact, even in extreme situations. Moreover, the thermal; conductivity of sol-gel materials is quite high and is in the order of magnitude of 0.5–2 W/m/° K.

As a result of certain requirements on heating elements the thickness of the electrically insulating layer has to be about 30–60 $\mu$m. As it is difficult to build up such a thick layer by sol-gel techniques, a polyimide layer 5 is applied on top of the sol-gel layer in order to provide for the desired thickness. However, the sol-gel layer is as thick as possible in order to make use of all its advantages as disclosed in the above.

EXAMPLE

Method of Manufacturing a Heating Element According to the Present Invention

The method of manufacturing the heating element according to the present invention at least comprises the following steps:

providing a substrate;

applying an electrically insulating layer on said substrate; and applying a resistive layer on top of the electrically insulating layer.

Below the different steps in the manufacturing method will be further elucidated.

Substrate

The first step in the manufacturing method is to provide a substrate. In the present case, referring to the above embodiment and the drawing, the substrate comprises an anodized aluminum plate which can be used as a sole plate for an iron. In order to ensure proper adhesion between all the layers the aluminium substrate has to be cleaned thoroughly. In the present case, the substrate is cleaned according to the following procedure:

the substrate is subjected to "Ultrasonic" cleaning (ca 1 min) in a 5% solution of neutral soap in de-mineralized water (Unitech Ultrasonic Cleaner);

then the substrate is washed out, subsequently, in a water bath, in streaming tap water, and with demi water; and finally the substrate is dried at 80° C.

Application of an Electrically Insulating Layer on the Substrate

Preparation of sol-gel Insulating Material

The sol-gel coatings used in the present exemplary embodiments were based on a mixture of methyltrimethoxysilane (MTMS), Ludox AS40 (40 weight % colloidal silica suspension in water), ethanol and maleic acid. $SiO_2$ sol was prepared by a single-step acid catalyzed synthetic method. Methyltrimethoxysilane (MTMS) (Aldrich Co., USA), ethanol (Merck), maleic acid and $H_2O$ (from Ludox) were combined in the molar ratio 1:1.37:0.0166:4.5. MTMS, EtOH and maleic acid were mixed at room temperature for a 2 min. Ludox AS40 (DuPont) was added and solution was mixed for 60 min. After mixing solution of sol was filtered through 5 and 2 $\mu$m filters. The weight ratio of Ludox and MTMS was 0.99. The recipe used and preparation procedure for applied sol-gel system are given below.

Sol-gel recipe

Step 1

MTMS (40 g)+ethanol (18.5 g)+maleic acid (0.568 g)

Stirring during 1–2 min (maleic acid must be dissolved)

Step 2

Addition of Ludox (AS-40) (39.6 g)

Stirring during 60 min.

After preparation, the silica sol solutions were filtered through 5 and 2 $\mu$m pore size filters (Whatman, N.J., USA) just before use to remove particles, which potentially may be present.

Application of a First sol-gel Layer on the Substrate

The sol-gel layer was applied on the aluminum surface within 2 hours after cleaning of the aluminum substrate.

The sol-gel layer was applied on the aluminum substrate by spin coating. Alternatively, the sol gel layer may be applied by spray coating. The procedure used in the present example was spin coating during 5 s at 400 (low) rpm followed by spin coating during 10 s at 800 (high) rpm, yielding a final thickness of the sol-gel layer of about 3–4 $\mu$m in one run. The coated substrate was thermally treated (dried) at 100° C. for 10 min to remove the solvent. This was done on a hotplate inside a clean room. After the drying stage, the substrate coated with sol-gel material is cured at 375° C. in a muffle furnace under air atmosphere during 20 min.

Application of Further sol-gel Layers

The resulting sol-gel layer is hydrophobic preventing proper adhesion of subsequent sol-gel layers and/or the polyimide layer. Pretreatment of the resulting layer by "flame" or UV/ozon to render the surface hydrophilic is therefore necessary. The required final layer thickness of the sol-gel insulating material therefore can be obtained by multiple cycles of spin coating-curing-flame treatment. Proper adhesion of the PI layer not only requires flame treatment of the sol gel layer, but also the use of an adhesion promotor like 3-aminopropyltrimethoxysilane (APS), which is applied from a diluted solution in deionized water.

Application of an PI-insulating Layer

The polyimide layer is prepared via a condensation reaction of polyamic acid (PAA) solution in NMP. The material used in this example is RC-5019 of Pyre-M.L. The high viscosity of this solution makes it possible to spincoat relatively thick layers of this material. A dried layer thickness of up to 20 $\mu$m is possible by a spin coating treatment of 5 s at 400 (low) rpm followed by spin coating during 10 s at 800 (high) rpm.

After spin coating the layer is dried at 150° C. for 10 minutes. After cooling down a second layer can be applied in the same way without further treatment. The elements are then finally cured at 375° C. for 30 minutes.

Application of the Resistive Layer on top of the Electrically Insulating Layer

The resistive or heat generating layer is applied using the screen printing technique. In the present case the resistive layer comprises a heat-generating track. The heat-generating track is a mixture of carbon and PAA (Pyre-M.L. RC-5019). This mixture behaves as a paste, as required for the screen printing process. The layer need to be dried at 80° C. for 10 minutes to flash off the NMP.

Other layers like the contacting tracks made of silver filled PAA and topcoat materials can be printed in the same way as the resistive layer using screen printing with subsequent drying.

Finally, the whole stack needs to be cured at 375° C. for 30 minutes in order to imidize the PAA to PI.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A heating element, comprising:
   a metal substrate having an exposed surface, and an electrically insulating layer applied onto said substrate, said electrically insulating layer including a sol-gel insulating layer and a resin layer.

2. The heating element of claim 1, wherein the sol-gel insulating layer includes a mixture of an organosilane compound and water.

3. The heating element of claim 2, wherein said organosilane compound includes methyltrimethoxysilane (MTMS).

4. The heating element of claim 2, wherein said organosilane compound includes tetraethoxysilane (TEOS).

5. A heating element, comprising:
   a substrate, and
   an electrically insulating layer applied onto said substrate,
   said electrically insulating layer including a sol-gel insulating layer and a resin layer
   the sol-gel insulating layer including a mixture of an organosilane compound and silica particles.

6. The heating element of claim 5, wherein said organosilane compound includes methyltrimethoxysilane (MTMS).

7. The heating element of claim 5, wherein said organosilane compound includes tetraethoxysilane (TEOS).

8. The heating element of claim 1, wherein said resin layer includes a polyimide.

9. A heating element, comprising:
   a substrate, and
   an electrically insulating layer applied onto said substrate, said electrically insulating layer including a sol-gel insulating layer and a resin layer,
   said resin layer including a polyimide,
   said polyimide being filled with an insulating filler.

10. The heating element of claim 1, wherein said resin layer includes a thermoplastic resin.

11. The heating element of claim 1, further comprising:
    an electrically resistive layer applied onto said electrically insulating layer.

12. A heating element, comprising:
    a substrate, and a sol-gel electrically insulating layer applied onto said substrate, said sol-gel electrically insulating layer including a mixture of a organosilane compound and silica particles.

13. The heating element of claim 12, wherein said organosilane compound includes methyltrimethoxysilane (MTMS).

14. The heating element of claim 12, wherein said organosilane compound includes tetraethoxysilane (TEOS).

15. The heating element of claim 12, further comprising:
    a resin electrically insulating layer applied onto said sol-gel electrically insulating layer, said resin electrically insulating layer including a polyimide.

16. The heating element of claim 15, wherein said polyimide is filled with an insulating filler.

17. The heating element of claim 16, further comprising:
    an electrically resistive layer applied onto said resin electrically insulating layer.

18. The heating element of claim 12, further comprising:
    a resin electrically insulating layer applied onto said sol-gel electrically insulating layer, said resin electrically insulating layer including a thermoplastic resin.

19. The heating element of claim 18, further comprising:
    an electrically resistive layer applied onto said resin electrically insulting layer.

* * * * *